INVENTOR.
K. Q. KESSLER

FIG. 2

*INVENTOR.*
K. Q. KESSLER

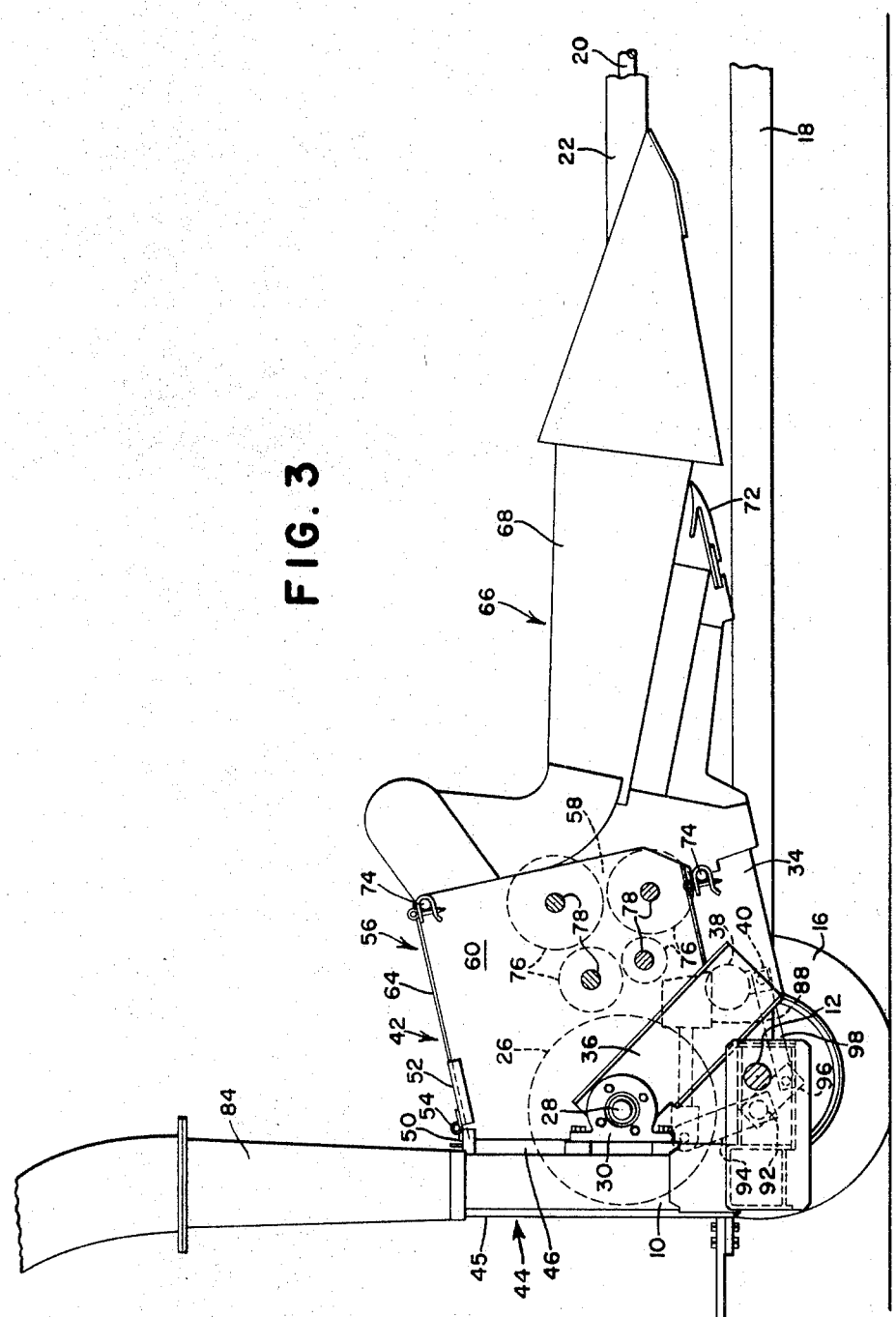

United States Patent Office 3,438,182
Patented Apr. 15, 1969

3,438,182
FORAGE HARVESTER
Kenneth Q. Kessler, Ottumwa, Iowa, assignor to Deere & Company, Moline, Ill., a corporation of Delaware
Filed June 3, 1965, Ser. No. 460,900
Int. Cl. A01d 41/04
U.S. Cl. 56—16          5 Claims

ABSTRACT OF THE DISCLOSURE

A pull-type forage harvester having a mobile main frame, an axially transverse rotary reel-type cutterhead journaled on the right side of the main frame, a forwardly extending secondary frame swingably mounted for vertical adjustment about the cutterhead shaft, a row-type harvesting unit mounted on and extending forwardly from the secondary frame, and a drive train for connecting the driven harvester components to the tractor power take-off shaft and including a fore-and-aft drive shaft above the main frame draft member and a transverse drive shaft coaxially connected to the cutterhead shaft.

---

Figure 1:
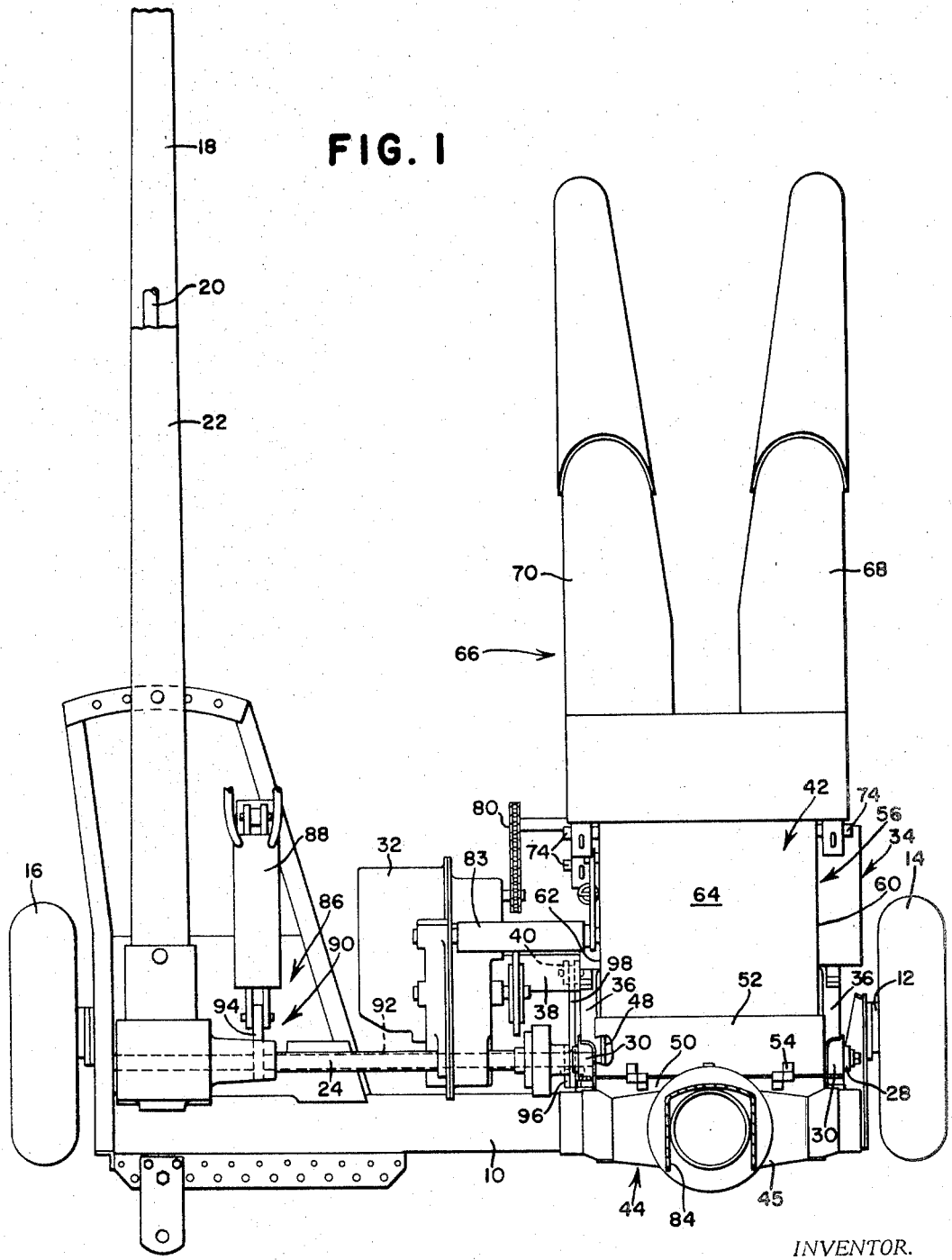

This invention relates to an agricultural crop handling machine and more particularly to a forage harvester or the like having an improved mounting for vertical adjustment of a harvesting means on the machine.

A typical forage harvester is towed over a field by a tractor or the like and includes a forwardly extending harvesting means for collecting the crop from the field, a rotary cutter, which reduces the crop, and an upwardly directed discharge spout for delivery of the reduced crop to a receptacle, conventionally a trailing wagon. Many machines of this type utilize an axially transverse, cylinder-type rotary cutter, having longitudinally extending knives on its outer periphery, and also include a plurality of transverse feed rolls for moving the crop rearwardly from the harvesting means to the cutter. The harvesting means can be one of several types of interchangeable units, such as a mower bar unit, a crop pick-up unit, or a row crop unit, and is conventionally vertically adjustable on the machine to vary the operating height of the harvesting means and to facilitate transport of the machine.

In certain previous machines, the harvesting unit has been rigidly attached to the main frame of the machine and has been vertically adjusted by rocking the main frame about the transverse machine axle. However, the movement of the frame would also tip the upwardly extending discharge spout attached to the frame, changing the direction of the material flow from the discharge spout.

In other machines, the harvesting unit has been pivotally attached to the cutter housing for vertical adjustment about an axis parallel to and spaced from the rotary cutter axis. However, the feed rolls were maintained in a fixed relationship to the cutter axis, and vertical adjustment of the harvesting means changed the relationship between the harvesting means and the feed rolls, creating a dead spot in the feeding means in certain positions of the harvesting means whereby the feeding means was susceptible to plugging.

According to the present invention, the harvesting unit and feed rolls are vertically adjustable about the transverse axis of the rotary cutter, whereby the position of the discharge spout and the relative positions of the feed rolls and harvesting unit do not change, regardless of the vertical position of the harvesting unit.

Another object is to provide a cutter housing having two telescoping portions, one portion being fixed to the main machine frame and the other being movable relative to the main frame with the feed rolls and the harvesting unit, so that the housing is substantially closed regardless of the vertical position of the harvesting unit and feed rolls.

Another object is to provide a drive means for the harvesting unit and feed rolls which will accommodate the vertical adjustment of the harvesting unit and feed rolls.

Another object is to provide means for controlling the vertical adjustment of the harvesting unit on the machine.

These and other objects will become apparent from the following detailed description and accompanying drawings wherein:

FIG. 1 is a plan view of the forage harvester.
FIG. 2 is a partly schematic side elevation view of the harvester with portions of the harvester removed and with the harvesting unit in a lowered position.
FIG. 3 is a view similar to FIG. 2 but with the harvesting unit in a raised position.

It is to be understood that the use of such terms as "forwardly," "rearwardly," "raised," "lowered," etc. is for convenience only, and such terms are not to be construed as limiting the orientation or geography of the components.

The forage harvester includes a mobile main frame 10 having a transverse axle structure 12 supported on right and left wheels 14 and 16. The main frame 10 is connectible to a tractor (not shown) by a forwardly extending draft member 18, above which is a fore-and-aft drive shaft 20, covered by a shield 22 and connectible at its forward end to a tractor power take-off (not shown) and at its rear end to a transverse drive shaft 24.

A cylinder-type rotary cutter 26 includes a transverse shaft 28 journalled on laterally spaced, frame-carried support members 30 and coaxially joined to and driven by the transverse drive shaft 24 through a transmission 32.

A secondary frame 34 includes a pair of laterally spaced arms 36 pivotally mounted on the support members 30 so that the secondary frame 34 is rockable in a vertical arc about the transverse cutter shaft 28. The secondary frame 34 also includes a transverse member 38 attached to the arms 36 and having a depending lug 40. The rotary cutter 26 rotates within a housing 42 including a rear housing portion 44, rigidly attached to the main frame 10 and including an upwardly directed outlet 45, opposite upright sides 46 and 48, and a top 50, the forward part 52 of which is vertically swingable on a transverse hinge means 54. A forward housing portion 56 is mounted on the secondary frame 34 and includes a forward inlet 58, opposite sides 60 and 62, and a top 64. The forward housing portion 56 and the rear housing portion 44 are mounted in a telescoping relationship at 60–46, 62–48 and 64–52 to provide a substantially closed housing, except for the outlet 45 and inlet 58, regardless of the relative position of the main frame and secondary frame.

A harvesting means 66, here shown as a row crop unit including a pair of laterally spaced members 68 and 70 for gathering the crop and a cutting mechanism 72 for severing the crop from the field, is detachably mounted on a plurality of attachment points 74 carried by the forward housing portion 56.

Although the harvesting means 66 is shown as a row crop unit, other types of harvesting units, such as a crop pick-up unit or a mower bar unit, can be readily substituted for the harvesting means shown.

The harvesting means 66 collects the crop from the field and delivers it rearwardly to a plurality of feed rolls 76 mounted on transverse shafts 78 journaled at opposite ends in the front portion sides 60 and 62. The harvesting means 66 is driven by a harvesting means drive 80 and the feed rolls 76 are rotated by a feed roll drive 83, the drives 80 and 83 being driven by the drive shaft 24 through the transmission 32. The feed rolls 76 move the crop rearwardly to the cutter 26, which reduces the crop, and impels it upwardly through the housing outlet 45 through a discharge means 84. The discharge means 84 is shown as an upwardly directed discharge spout which directs the flow of material to a receptacle, conventionally a trailing wagon (not shown). Other types of discharge means, such as a conveyor means or blower-type elevator, could be utilized for moving the crop to the receptacle.

The position of the secondary frame 34 relative to the main frame 10, and consequently the position of the front housing portion 56, feed rolls 76 and harvesting means 66, is established by a control means 86 extending between the main frame 10 and the secondary frame 34. The control means 86 includes a hydraulic ram 88, having one end mounted on the main frame 10, and a connecting means 90 connecting the other end of the hydraulic ram 88 to the secondary frame 34. The connecting means 90 includes a transverse rockshaft 92 journaled on the main frame, a first lever arm 94 mounted on the rockshaft 92 and connected to the hydraulic ram 88 for rotation of the rockshaft in response to actuation of the ram 88, a second lever arm 96 also attached to the rockshaft 92, and a pitman 98 extending between the second lever arm 96 and the lug 40 on the transverse member 38, whereby the secondary frame 34 rocks about the cutter shaft 28 in response to rotation of the rockshaft.

In FIG. 2, the hydraulic ram 88 is retracted to support the harvesting means 66 in its lower position with the cutting mechanism 72 proximate to the ground. To raise the harvesting means 66 to a higher operating position or to a transport position, as shown in FIG. 3, the hydraulic ram 88 is extended, rotating the rockshaft 92 in a counterclockwise direction, the pitman 98 forcing the transverse member 38 forwardly and upwardly. Since the member 38 forms a part of the secondary frame 34, the secondary frame and the forward housing portion 56 mounted thereon raise in an arc about the transverse axis of the rotary cutter 26, about which the secondary frame 34 pivots on the main frame 10, thereby raising the harvesting means 66 carried by the secondary frame. Since the feed rolls 76 are mounted on the forward housing portion 56, they also raise with the harvesting means 66 about the cutter axis, maintaining their same position relative to the harvesting means.

The forward end of the transmission 32 is supported by the transverse member 38, so that, when the member 38 raises, the transmission 32 also raises in an arc about the drive shaft 24, which is coaxial with the cutter shaft 28. Thus, the position of the transmission 32 relative to the harvesting means 66 and feed rolls 76 is the same regardless of the position of the harvesting means, thus eliminating any necessity for adjustment in the harvesting means drive 80 and feed roll drive 83 as the harvesting means and feed rolls are raised and lowered.

Since the rear housing portion 44 and the discharge means 84 are rigidly mounted on the main frame 10, they do not change their positions on the main frame as the harvesting means 66 raises or lowers, the rear housing portion 44 telescoping within the forward portion 56 as the forward housing portion raises, forming a substantially closed housing 42 regardless of the position of the harvesting means.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. A forage harvester comprising: a mobile main frame adapted to advance over a field; a rotary-type cutter including a transverse axial shaft; a secondary frame pivotally carried by the main frame for rocking about the cutter means axis between first and second positions; means for rocking said secondary frame between said positions; a rear housing portion mounted on the main frame in at least partially enclosing relation to the cutter means and including an outlet; a forward housing portion mounted on the secondary frame and including an inlet, said housing portions being mounted in a telescoping relationship to form a substantially closed housing except for the outlet and inlet in either position of the secondary frame, a harvesting means mounted on the secondary frame for collecting crops from the field; means operably carried by the secondary frame for moving the crop from the harvesting means through said inlet and to the cutter; a drive means connected to the cutterhead for rotating the cutter to reduce the crop in said housing; and discharge means rigidly mounted on the main frame and communicating with the outlet for discharge of the reduced crop.

2. A forage harvester comprising: a mobile main frame adapted to advance over a field; a secondary frame pivotally carried by the main frace for rocking about a transverse axis between alternate positions; a rear housing portion mounted on the main frame and including an outlet; a forward housing portion including an inlet and mounted on the secondary frame in a telescoping relationship with the rear housing portion, said housing portions forming a substantially closed cutter housing except for the outlet and inlet; means for collecting crops from the field and moving the crops through the cutter housing inlet and operably carried by the secondary frame and movable therewith; a rotary cutter means mounted for rotation within the cutter housing for reducing the crop within the housing and impelling it through the outlet and including an axial shaft rotatable about a transverse axis substantially coaxial with the secondary frame pivot axis; means for rocking the secondary frame between said positions and a drive means operably connected to the rotary cutter means for rotating the cutter means, and including a power transmission means having a first output shaft coaxially connected to the rotary cutter shaft.

3. The invention defined in claim 2 wherein the means for rocking the secondary frame includes a hydraulic ram having one end attached to the main frame and the other end operably connected to the secondary frame.

4. The invention defined in claim 2 wherein the drive means includes a transverse transmission input drive shaft journaled on the main frame coaxially with the first output shaft and drivingly connected to the power transmission means and the transmission means is carried by the secondary frame for swinging about the axis of said input and output shafts and includes at least one additional output shaft parallel to the first input shaft and drivingly connected to the crop collecting means.

5. An agricultural harvesting machine adapted to be towed behind a tractor having a power take-off means, said machine comprising: a mobile main frame mounted on a pair of laterally spaced ground-engaging wheels and including a fore-and-aft extending draft member attachable to the tractor; a secondary frame pivotally mounted on the main frame for swinging in a vertical arc about a predetermined transverse axis between a lowered operative position and a raised transport position; a harvesting means mounted on the secondary frame for vertical swinging movement therewith about said predetermined axis; a generally fore-and-aft drive shaft journaled on the main frame and connectible to and drivable by the tractor power take-off; a transverse drive shaft connected to and driven by the fore-and-aft drive shaft and journaled on the main frame coaxially with said predetermined axis; a reel-type rotary cutter mounted on the frame for rotation about said predetermined axis and having an axial shaft connected to and driven by said transverse drive shaft; and means drivingly connecting the trnsverse drive shaft to said harvesting means.

References Cited

UNITED STATES PATENTS

| | | | |
|---|---|---|---|
| 1,528,635 | 3/1925 | Ronning et al. | 56—16 |
| 2,822,656 | 2/1958 | Rogers | 56—208 |

ANTONIO F. GUIDA, *Primary Examiner.*